(12) United States Patent
Jung et al.

(10) Patent No.: US 8,669,344 B2
(45) Date of Patent: Mar. 11, 2014

(54) METHOD OF DEASHING FROM POLYMER SOLUTIONS

(75) Inventors: Hye-Young Jung, Daejeon Metropolitan (KR); Sung-Ho Chun, Daejeon Metropolitan (KR); Sung-Don Hong, Daejeon Metropolitan (KR); Jung-Min Lee, Daejeon Metropolitan (KR); Heon Kim, Daejeon Metropolitan (KR); Dmitry Kravchuk, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/225,814

(22) PCT Filed: Apr. 6, 2007

(86) PCT No.: PCT/KR2007/001693
§ 371 (c)(1),
(2), (4) Date: Sep. 30, 2008

(87) PCT Pub. No.: WO2007/117098
PCT Pub. Date: Oct. 18, 2007

(65) Prior Publication Data
US 2009/0281264 A1    Nov. 12, 2009

(30) Foreign Application Priority Data

Apr. 7, 2006 (KR) .................. 10-2006-0031947

(51) Int. Cl.
*C08F 6/22* (2006.01)
(52) U.S. Cl.
USPC ............... 528/492; 528/4; 528/170; 528/171; 528/271; 528/310; 528/480; 528/486
(58) Field of Classification Search
USPC ............... 528/492, 480, 486, 4, 310, 271; 526/170, 171
See application file for complete search history.

(56) References Cited

U.S. PATENT DOCUMENTS

| | | | | |
|---|---|---|---|---|
| 4,011,200 A | * | 3/1977 | Yonemitsu et al. | 528/86 |
| 4,080,491 A | * | 3/1978 | Kobayashi et al. | 526/137 |
| 4,088,634 A | * | 5/1978 | Cooper et al. | 528/493 |
| 4,098,991 A | * | 7/1978 | Kang | 528/492 |
| 6,217,779 B1 | * | 4/2001 | Orth et al. | 210/757 |
| 6,894,145 B2 | | 5/2005 | Xiao et al. | |
| 7,442,752 B2 | * | 10/2008 | Chun et al. | 526/281 |
| 2009/0192277 A1 | * | 7/2009 | Yoon et al. | 526/171 |
| 2009/0264608 A1 | * | 10/2009 | Wakatsuki et al. | 526/171 |

FOREIGN PATENT DOCUMENTS

| | | |
|---|---|---|
| EP | 0 860 451 A1 | 8/1998 |
| EP | 0 914 482 B1 | 3/2002 |
| KR | 10-2002-0057426 A | 7/2002 |
| KR | 10-2004-0080467 A | 9/2004 |
| WO | WO 2004007587 A1 * | 1/2004 |

* cited by examiner

*Primary Examiner* — Michael L Leonard
(74) *Attorney, Agent, or Firm* — McKenna Long & Aldridge, LLP

(57) ABSTRACT

A method of removing a residual catalyst metal compound from a polymer solution comprises the steps of: a) mixing a solution in which at least one organic nitrogen compound is dissolved in a polar solvent and the polymer solution to precipitate a chelate compound of the organic nitrogen compounds and the residual catalyst metal compound, b) adding the polar solvent to the solution mixture to dissolve a chelate compound and to precipitate a polymer, and c) filtering the precipitated polymer. After the polymer polymerization is completed, an organic nitrogen compound solution is added to perform a chelate reaction with the residual catalyst metal compound in a solution phase, and the polar solvent is added to precipitate the polymer so that only polymer precipitates are filtered while an additional filtration process in respect to the chelate compound is not performed to easily remove the residual catalyst metal compound.

6 Claims, No Drawings

METHOD OF DEASHING FROM POLYMER SOLUTIONS

This application is an application based on International Patent Application No. PCT/KR2007/001693 filed Apr. 6, 2007, which claims the benefit of Korean Application No. 10-2006-0031947 filed Apr. 7, 2006, which are hereby incorporated by reference for all purposes as if fully set forth herein.

TECHNICAL FIELD

The present invention relates to a method of removing a residual catalyst metal compound from a polymer solution. More particularly, the present invention pertains to a method of removing a residual catalyst metal compound from a polymer solution in which an organic nitrogen compound dissolved in a polar solvent is added to a polymer solution containing a metal compound to react the metal compound present in the polymer solution with the organic nitrogen compound, and the polymer is precipitated by using the polar solvent and then separated from the solution phase through a filtration process so that a chelate compound of the metal compound and the organic nitrogen compound dissolved in the solution is separated to be removed.

This application claims priority from Korea Patent Application No. 10-2006-0031947 filed on Apr. 7, 2006 in the KIPO, the disclosure of which is incorporated herein by reference in its entirety.

BACKGROUND ART

In general, a metal compound is added as a reaction catalyst in order to promote a polymerization reaction during polymerization of polymer compounds. The metal compound remains in the polymer after the polymerization reaction. The remaining metal catalyst compound acts as a main factor that generates cracks on a film and reduces transparency during the production of the polymer film. Furthermore, a high temperature is required during molding of polymer products, and there are problems in that the polymer is discolored or decomposed due to the catalyst compound which is present at high temperatures, significantly reducing physical properties thereof. Accordingly, there remains a need to provide a method of removing the remaining metal catalyst compound after the polymerization of the polymer due to the above-mentioned reasons.

Examples of a method of removing a metal catalyst compound from a polymer solution include a method of performing treatment by using a solution mixture of an excessive amount of a hydrochloric acid and ethanol or an excessive amount of sodium hydroxide solution. However, removal efficiency of the metal catalyst compound from the polymer solution is not high, a separate neutralization process is required because an excessive amount of acid or base is used, and there are problems in views of safety of equipment and an environment. Therefore, the method is not desirable.

In another method, a metal compound is extracted by using a substance that is capable of extracting a metal catalyst compound present in the polymer solution in a solution state, and then separated from the polymer solution to remove a solution layer from which the metal compound is extracted and to obtain a clean polymer solution. However, a great amount of substance is used to extract the metal catalyst compound, and it is required that a process of treating the extraction substance is separately performed.

Furthermore, there is a method of using an ion exchange resin. In the method, an ion exchange resin that has a strong basic or strong acidic functional group is added in a state where a metal catalyst compound is present in a polymer solution to remove the metal catalyst compound. However, since there are problems in that removal efficiency of the catalyst compound is low, a strong acid and a strong base must be used during regeneration of the used ion exchange resin, and a price of ion exchange resin is high, it is difficult to commercialize the method.

If a chelate compound of the metal catalyst compound is formed by using a chelate, precipitated, and filtered, the metal catalyst compound is easily removed. However, there are problems in that a filtration material must be used during the filtration process and periodically replaced because a filtering speed is reduced as the number of filtration is increased due to a process characteristic. Furthermore, in the case of when selection of the chelate is not preferable, removal efficiency of the metal catalyst compound may be very low, and a phase separation may occur in respect to a polymer that is dissolved in a solvent due to a polar functional group of the chelate.

In the case of when an inorganic filler having a polar functional group is added to a polymer solution in order to avoid the above-mentioned problems of the filtration material, a chelate of a metal catalyst compound of the solution and the functional group of the inorganic filler is formed so that only the inorganic filler is filtered to remove the metal catalyst compound, thus a subsequent process of using the filtration material is not required. However, since the price of the inorganic filler having the functional group is very high, this process is difficult to be commercialized.

DISCLOSURE OF INVENTION

Technical Problem

Therefore, the present invention has been made keeping in mind the above disadvantages occurring in the related art, and an object of the present invention is to provide a method of removing a chelate compound of a metal catalyst compound and an organic nitrogen compound in a solution state in order to remove the residual catalyst metal compound from a polymer. The method comprises adding a solution where at least one organic nitrogen compound is dissolved to a polymer solution.

That is, the present invention aims to provide a method of removing a metal catalyst compound from a polymer. In the method, the metal catalyst compound present in the polymer solution is efficiently removed while an additional process is not added to a known process to maximize the productivity and economic efficiency of the polymer, and catalyst residuals are removed from the polymer to improve physical properties such as high transparency and heat resistance.

Technical Solution

In order to accomplish the above object, the present invention provides a method of removing a residual catalyst metal compound from a polymer solution. The method comprises the steps of a) mixing a solution in which at least one organic nitrogen compound is dissolved in a polar solvent and the polymer solution to precipitate a chelate compound of the organic nitrogen compounds and the residual catalyst metal compound, b) adding the polar solvent to the solution mixture to dissolve the chelate compound and to precipitate a polymer, and c) filtering the precipitated polymer.

In the method of removing the residual catalyst metal compound from the polymer solution, the organic nitrogen compound is a compound that is represented by Formula 1 or Formula 2:

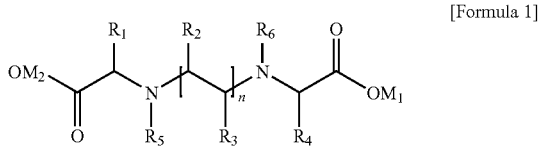
[Formula 1]

wherein n is 0, 1, or 2, $R_1$, $R_2$, $R_3$, and $R_4$ are the same or different from each other and are each independently hydrogen or an alkyl group having 1 to 5 carbon atoms, $R_5$ and $R_6$ are the same or different from each other and are each independently hydrogen, an alkyl group having 1 to 5 carbon atoms, a carboxylic acid, or a carboxylate, and $M_1$ and $M_2$ are each metal of Group 1A,

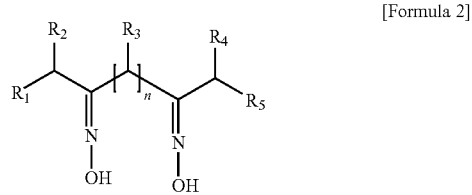
[Formula 2]

wherein n is 0, 1, or 2, and $R_1$, $R_2$, $R_3$, $R_4$, and $R_5$ are the same or different from each other and are each independently hydrogen or an alkyl group having 1 to 5 carbon atoms.

In the method, a weight ratio of the polymer and the polar solvent in step b) is 1:3 to 50.

Furthermore, the present invention provides a polymer which is purified according to the above-mentioned method of removing the residual catalyst metal compound from the polymer.

In the present invention, after an organic nitrogen compound solution is added to perform a reaction so that a chelate compound of the organic nitrogen compound solution and a residual catalyst metal compound in a polymer solution, polymer precipitates that are generated due to a difference in solubility to a polar solvent are filtered in the polymer solution to separate the residual catalyst metal compound, thereby the residual catalyst metal compound is removed. In other words, only the polymer precipitates are filtered through a filtration process and a chelate compound of the residual catalyst metal compound and the organic nitrogen compound is dissolved in a filtration solution to be removed.

Advantageous Effects

According to the present invention, after the polymer polymerization is completed, an organic nitrogen compound solution is added to perform a chelate reaction with a residual catalyst metal compound in a solution phase, and a polar solvent is added to precipitate the polymer so that only polymer precipitates are filtered while an additional filtration process in respect to the chelate compound is not performed to easily remove the residual catalyst metal compound. Thereby, it is possible to produce products that are of good quality.

BEST MODE FOR CARRYING OUT THE INVENTION

A detailed description will be given of the present invention hereinafter.

A method of removing a residual catalyst metal compound from a polymer solution according to the present invention comprises the steps of a) mixing a solution in which at least one organic nitrogen compound is dissolved and the polymer solution to precipitate a compound containing the organic nitrogen compounds and the residual catalyst metal compound, b) adding a polar solvent to the solution mixture to dissolve a chelate compound and to precipitate a polymer, and c) filtering the precipitated polymer.

In the step a), the organic nitrogen compound is a chelate agent that is used to form a chelate compound in conjunction with the metal catalyst compound (a catalyst and a cocatalyst component) present in a polymerization solution. The organic nitrogen compound may be mixed with a polymer solution containing a nonpolar solvent as a solvent while the organic nitrogen compound is dissolved in a small amount of polar solvent. The chelate agent is a compound that generally contains at least two unshared electron pairs and forms a stable chelate ring in conjunction with metal ions to prevent the metal ions from incurring other chemical actions. The solution mixture has nonpolarity, thus the chelate compound forms precipitates.

Preferable examples of the polar solvent that is used to dissolve the organic nitrogen compound include water, alcohol, acetone, ethylene glycol, or glycerol.

The organic nitrogen compound is preferably a compound that has at least two organic carboxylate functional groups or at least two hydroxy functional groups and at least two nitrogen elements, and more preferably a compound that is represented by the following Formula 1 or Formula 2.

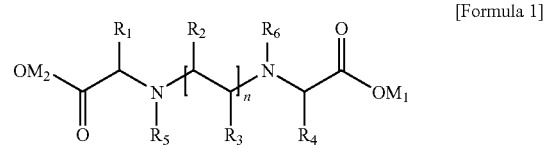
[Formula 1]

In Formula 1, n is 0, 1, or 2, $R_1$, $R_2$, $R_3$ and $R_4$ are the same or different from each other and are each independently hydrogen or an alkyl group having 1 to 5 carbon atoms, $R_5$ and $R_6$ are the same or different from each other and are each independently hydrogen, an alkyl group having 1 to 5 carbon atoms, a carboxylic acid, or a carboxylate, and $M_1$ and $M_2$ are each metal of Group 1A.

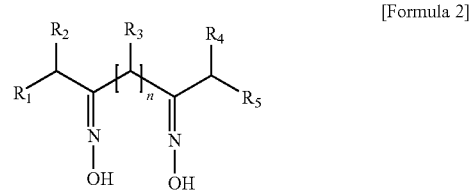
[Formula 2]

In Formula 2, n is 0, 1, or 2, and $R_1$, $R_2$, $R_3$, $R_4$, and $R_5$ are the same or different from each other and are each independently hydrogen or an alkyl group having 1 to 5 carbon atoms.

Preferable examples of the organic nitrogen compound includes ethylenediaminetetraacetic acid tetrasodium salts, ethylenediaminetetraacetic acid disodium salts, ethylenediaminetetraacetic acid dipotassium salts, dimethylglyoxime, or dimethylglyoxime disodium salts.

The concentration of the organic nitrogen compound that is used in the present invention may be preferably 0.1 to 20 parts by weight based on 100 parts by weight of the polymer, and the concentration of the organic nitrogen compound solution that is added to the polymer solution may be 0.1 to 50 wt %. In the case of when the concentration of the organic nitrogen compound is less than 0.1 parts by weight based on 100 parts by weight of the polymer, removal efficiency of the residual metal is poor. In the case of when the concentration is more than 20 parts by weight, the organic nitrogen compound is incorporated in the polymer to reduce physical properties of the polymer.

Preferably, the metal catalyst compound may be at least one selected from the group consisting of metals of Groups 1A, 2A, 3B, 4B, 5B, 6B, 7B, 8, 1B, 2B, 3A, 4A, 5A, and 6A. More preferably, the metal catalyst compound may be at least one selected from the group consisting of metals of Groups 3B, 4B, 5B, 6B, 7B, 8, 1B, and 2B.

Since the polymer compound is dissolved in a nonpolar solvent but not in a polar solvent, the chelate compound that is precipitated in the step b) as an excessive amount of polar solvent is added to the solution mixture of the step a) is dissolved and precipitates of the polymer are formed. Examples of the nonpolar solvent of the polymer solution may include toluene, chloroform, hexane, or a hydrocarbon solvent having 4 to 10 carbon atoms.

Preferably, the polymer compound is an additional polymer of norbornene-based monomers that is represented by the following Formula 3 or Formula 4, and may be a homopolymer of one monomer selected from the above-mentioned monomers or a copolymer of at least two monomers selected from the above-mentioned monomers.

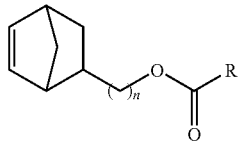

[Formula 3]

In Formula 3,
n is an integer of 1 to 10, and
R is an alkyl group having 1 to 20 carbon atoms.

According to another embodiment of the present invention, it is preferable that the monomer composition of the additional polymer contain at least one of the monomer which contains an excessive amount of exo isomers and is represented by the above-mentioned Formula 3 and the monomer which is represented by the following Formula 4.

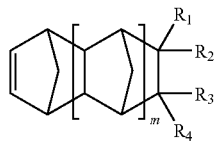

[Formula 4]

In Formula 4,
m is an integer of 0 to 4;
$R_1$, $R_2$, $R_3$, and $R_4$ are the same or different from each other, and are each independently hydrogen; halogen; linear or branched alkyl that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenyl that has 2 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynyl that has 3 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkyl that has 3 to 12 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; aryl that has 6 to 40 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or a polar functional group that comprises at least one selected from the group consisting of oxygen, nitrogen, phosphorus, sulfur, silicon, and boron, and with a proviso that $R_1$, $R_2$, $R_3$, and $R_4$ are not hydrogen, halogen, or the polar functional group, $R_1$ and $R_2$, or $R_3$ and $R_4$ may be connected to each other to form an alkylidene group having 1 to 10 carbon atoms, or $R_1$ or $R_2$ may be connected to any one of $R_3$ and $R_4$ to form a saturated or unsaturated aliphatic ring having 4 to 12 carbon atoms or an aromatic ring having 6 to 24 carbon atoms.

Specific examples of the polar functional group include
—$R_5OR_6$, —$OR_6$, —$OC(O)OR_6$, —$R_5OC(O)OR_5$, —$C(O)OR_6$, —$R_6C(O)OR_6$, —$C(O)R_6$, —$R_5C(O)R_6$, —$OC(O)R_6$, —$R_5OC(O)R_6$, —$(R_5O)_p$—$OR_6$, —$(OR_5)_p$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(\!=\!O)R_6$, —$R_5S(\!=\!O)R_6$, —$R_5C(\!=\!S)R_6$—, —$R_5C(\!=\!S)SR_6$, —$R_5SO_3R_6$, —$SO_3R_6$, —$R_5N\!=\!C\!=\!S$, —$N\!=\!C\!=\!S$, —$NCO$, —$R_5$—$NCO$, —$CN$, —$R_5CN$, —$NNC(\!=\!S)R_6$, —$R_5NNC(\!=\!S)R_6$, —$NO_2$, —$R_5NO_2$,

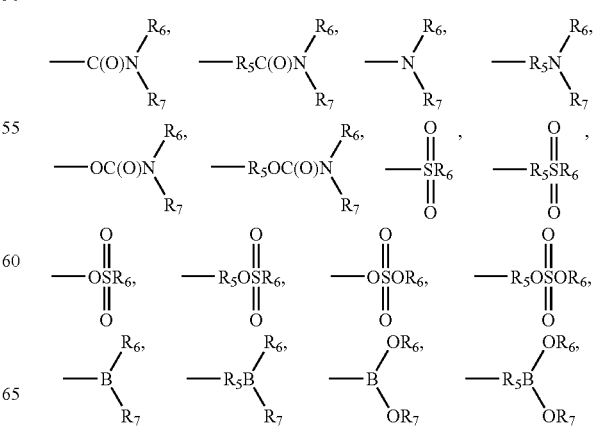

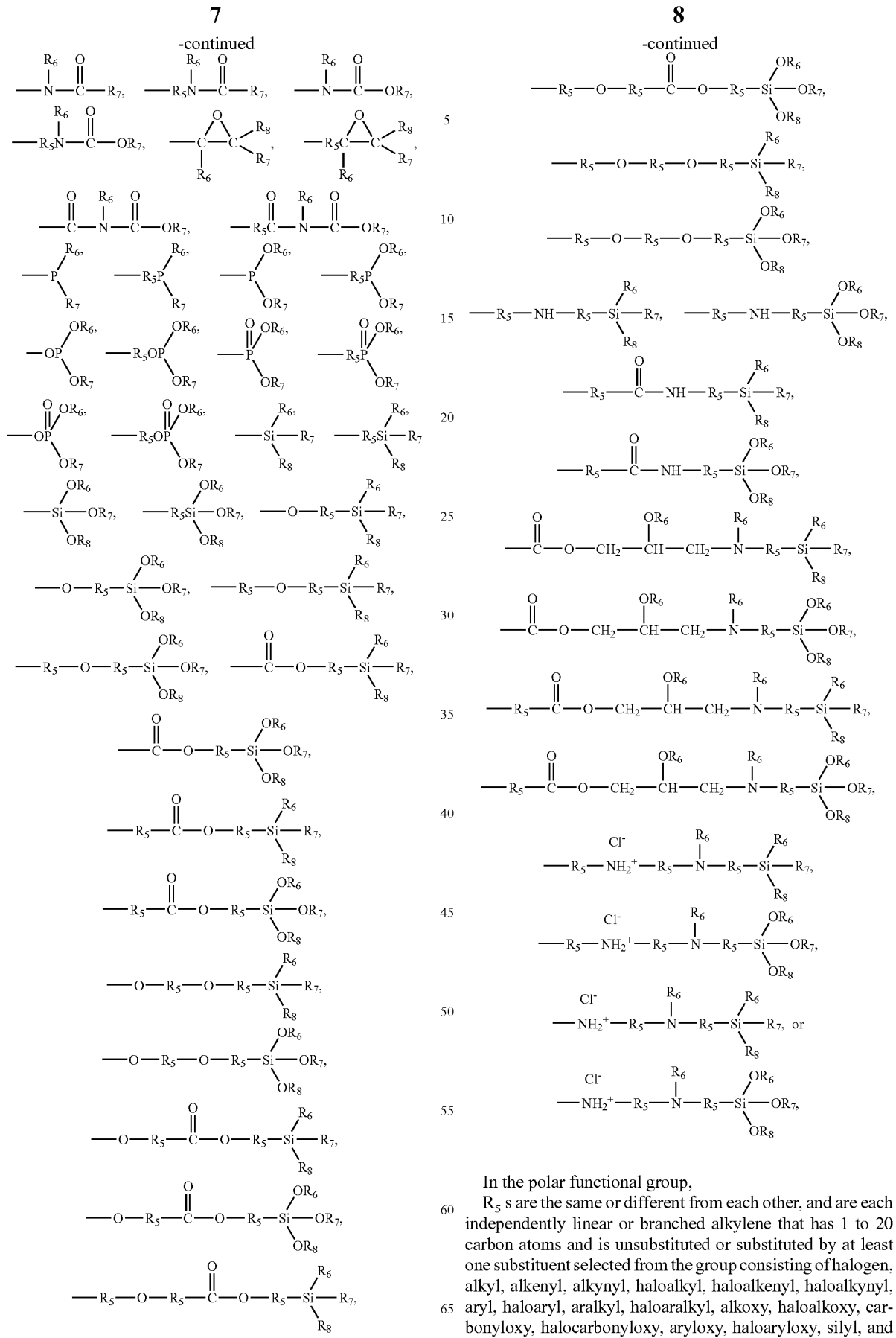

In the polar functional group, $R_5$ s are the same or different from each other, and are each independently linear or branched alkylene that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenylene that has 2 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynylene that has 3 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkylene that has 3 to 12 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; arylene that has 6 to 40 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; alkoxylene that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or carbonyloxylene that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy, $R_6$, $R_7$, and $R_8$ are the same or different from each other, and are each independently hydrogen; halogen; linear or branched alkyl that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenyl that has 2 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynyl that has 3 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkyl that has 3 to 12 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; aryl that has 6 to 40 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; alkoxy that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or carbonyloxyl that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy, and p is each independently an integer of 1 to 10.

In the above-mentioned alkyl, alkenyl, vinyl, alkoxy, carbonyloxy, cycloalkyl, aryl, aralkyl, alkynyl, aryloxy, haloalkyl, haloalkenyl, halovinyl, haloalkoxy, halocarbonyloxy, halocycloalkyl, haloaryl, haloaralkyl, haloalkynyl, and haloaryloxy, at least one hydrogen atom may be substituted or unsubstituted. The substituent group may be a straight line type or a branch type, and examples of the substituent group may include non-hydrogen atoms such as halogens and alkali metals, or polar or nonpolar groups such as nitro groups, cyano groups, sulfonic acid groups, phosphonic acid groups, hydroxyl groups, thiol groups, carboxyl groups, amino groups, acyl groups, alkoxy groups, alkylsulfanyl groups, alkyl groups, alkenyl groups, alkynyl groups, heterocyclic groups, and aromatic groups.

The polar solvent that is added in the step b) is preferably a polar solvent that is well mixed with the solvent applied to the organic nitrogen compound in the step a), and more preferably the same solvent as the solvent applied to the organic nitrogen compound. For example, the polar solvent that is selected from the group consisting of hydrophilic solvents such as alcohols or ketones may be used, but is not limited thereto.

Preferably, a weight ratio of the polymer and the polar solvent is 1:3 to 50 in the step b). In the case of when the positive polar solvent is added in an amount of less than 1:3, since the polymer is not sufficiently precipitated, the yield of the resulting polymer is reduced. In the case of when the positive polar solvent is added in an amount of more than 1:50, the amount of the solvent which is used during the precipitation process may be increased to reduce processability and economic efficiency.

In the step c), the polymer precipitates are filtered to be separated from the residual catalyst metal compound of the solution and the chelate compound of the organic nitrogen compound, thereby the residual catalyst metal compound is removed from the polymer.

As to the reaction condition, in the case of the polymer solution where the content of the polymer is 2 to 50 wt %, the reaction temperature is 20 to 150° C., the agitation speed is 100 to 1,0001 rpm, the reaction time is 1 to 18 hours, and the concentration of the organic nitrogen compound solution is 0.1 to 50 wt %.

Preferably, the content of the polymer of the polymer solution is 2 to 50 wt % in the step a). In the case of when the content of the polymer of the polymer solution is less than 2 wt %, the amount of the precipitation solvent that is used during the polymer precipitation process is significantly increased to reduce the processability and economic efficiency. In the case of when the content is more than 50 wt %, since the viscosity of the solution phase is increased, formation of the chelate with the organic metal compound is not efficiently achieved.

Preferably, the concentration of the organic nitrogen compound solution is 0.1 to 50 wt % in the step a). In the case of when the concentration of the organic nitrogen compound solution in the step a) is less than 0.1 wt %, removal efficiency of the residual catalyst metal compound is low. In the case of when the concentration is more than 50 wt %, removal efficiency of the residual catalyst metal compound is reduced and the residual catalyst metal compound is incorporated in the polymer during the formation of the polymer precipitates to reduce physical properties of the polymer.

According to another aspect of the present invention, there is provided a polymer that is purified according to the method of the present invention.

According to still another aspect of the present invention, there is provided a polymer that is purified and contains 0 to 15 ppm of residual catalyst metal compound. That is, if the polymer is purified by using the method of the present invention, the residual catalyst metal compound may be contained in content of 0 to 15 ppm. The results can be shown in the following Table 1.

Mode for the Invention

A better understanding of the present invention may be obtained in light of the following Examples and Comparative Examples which are set forth to illustrate, but are not to be construed to limit the present invention.

EXAMPLE

Preparation of a Polymer Solution

Preparation Example 1

After a 500 ml batch reactor that was cleaned and completely dried was prepared in an argon atmosphere, 216 ml of dry toluene and 60 ml of purified 5-norbornene-2-allyl acetate were added and the temperature of the reactor was increased to 90° C. Palladium acetate (Pd(OAc)$_2$) (8.4 mg, 38 µmol), tricyclohexylphosphine (10.5 mg, 38 µmol), and dimethylanilinium tetrakis(pentafluorophenyl)borate (60.1 mg, 75 µmol) were added to the prepared reactor as the catalyst that was dissolved in dichloromethane (3 ml), and agitated for 18 hours to perform polymerization, and the polymerization reaction was then stopped. Through the polymerization, 58 g of polymer was obtained (93 wt % on the basis of a total amount of added monomers). The weight average molecular weight (Mw) of the polymer was 247,521, and Mw/Mn was 2.04. An experiment in which the residual catalyst metal compound was removed from the polymer solution by using the resulting polymer solution was performed.

Preparation Example 2

After a 500 ml batch reactor that was cleaned and completely dried was prepared in an argon atmosphere, 244 ml of dry toluene, 97.7 ml of purified 5-norbornene-2-allyl acetate, and 43.8 ml of 5-norbornene-2-carboxylic acid methyl ester were added and the temperature of the reactor was increased to 90° C. Palladium acetate (Pd(OAc)$_2$) (38.6 mg, 172 µmol), tricyclohexylphosphine (48.2 mg, 172 µmol), and dimethylanilinium tetrakis(pentafluorophenyl)borate (275.6 mg, 344 µmol) were added to the prepared reactor as the catalyst that was dissolved in dichloromethane (3 ml) and agitated for 18 hours to perform polymerization, and the polymerization reaction was then stopped. Through the polymerization, 127.3 g of polymer was obtained (91.4 wt % on the basis of a total amount of added monomers). The weight average molecular weight (Mw) of the polymer was 148,137, and Mw/Mn was 2.02. An experiment in which the residual catalyst metal compound was removed from the polymer solution by using the resulting polymer solution was performed.

Example 1

1) Step of Forming the Chelate 276 ml of the polymer solution that was obtained in Preparation Example 1 was put into a 3 L batch reactor, 900 ml of toluene was added, and agitation was performed at a temperature of 90° C. and an agitation speed of 500 rpm. After 10 g of the solution in which ethylenediaminetetraacetic acid tetrasodium salts were dissolved in water in content of 10 wt % was added and the reaction was performed for 3 hours, the reactants were cooled to normal temperature.

2) Step of Forming Polymer Precipitates 20 parts by weight of ethanol was added to the polymer solution based on 100 parts by weight of the polymer to obtain the polymer precipitates.

3) Filtration Step

The solution in which the polymer was precipitated was filtered to filter polymer solids and then dried at 70° C. and a reduced pressure for 18 hours, and the amount of the residual catalyst metal compound in the polymer was measured. The results are described in Table 1.

Example 2

The step of preparing the polymer solution, the step of forming the chelate, and the step of forming the polymer precipitates and performing the filtration were performed by using the same process as Example 1, except that ethylenediaminetetraacetic acid disodium salts were used as the chelate agent in the course of forming the chelate, and the amount of the residual catalyst metal compound in the polymer was measured. The results are described in Table 1.

Example 3

The step of forming the chelate, the step of forming the polymer precipitates, and performing the filtration were carried out by using the same process as Example 1, except that ethylenediaminetetraacetic acid dipotassium salts were used as the chelate agent in the course of forming the chelate, and the amount of the residual catalyst metal compound in the polymer was measured. The results are described in Table 1.

Example 4

The step of forming the chelate, the step of forming the polymer precipitates, and the filtration step were performed by using the same process as Example 1, except that dimethylglyoxime was used as the chelate agent in the course of forming the chelate, and the amount of the residual catalyst metal compound in the polymer was measured. The results are described in Table 1.

Example 5

1) Step of Forming the Chelate 276 ml of the polymer solution that was obtained in Preparation Example 1 was put into a 3 L batch reactor, 900 ml of toluene was added, and agitation was performed at a temperature of 90° C. and an agitation speed of 500 rpm. After 5 g of the solution in which ethylenediaminetetraacetic acid tetrasodium salts were dissolved in water in content of 10 wt % and 5 g of the solution in which dimethylglyoxime was dissolved in aceton in content of 10 wt % were added and the reaction was performed for 3 hours, the reactants were cooled to normal temperature.

2) Step of Forming Polymer Precipitates

The precipitates were formed by using the same procedure as Example 1.

3) Filtration Step

The procedure of Example 1 was repeated, and the amount of the residual catalyst metal compound in the polymer was measured. The results are described in Table 1.

Example 6

1) Step of Forming the Chelate 276 ml of the polymer solution that was obtained in Preparation Example 2 was put into a 3 L batch reactor, 900 ml of toluene was added, and agitation was performed at a temperature of 90° C. and an agitation speed of 500 rpm. After 5 g of the solution in which ethylenediaminetetraacetic acid tetrasodium salts were dissolved in water in content of 10 wt % and 10 g of the solution in which dimethylglyoxime was dissolved in aceton in content of 10 wt % were added and the reaction was performed for 3 hours, the reactants were cooled to normal temperature.

2) Step of Forming Polymer Precipitates

The precipitates were formed by using the same procedure as Example 1.

3) Filtration Step

The procedure of Example 1 was repeated, and the amount of the residual catalyst metal compound in the polymer was measured. The results are described in Table 1.

Example 7

The step of preparing the polymer solution, the step of forming the chelate, the step of forming the polymer precipitates, and performing the filtration were performed by using the same process as Example 6, except that ethylenediaminetetraacetic acid disodium salts were used as the chelate agent in the course of forming the chelate, and the amount of the residual catalyst metal compound in the polymer was measured. The results are described in Table 1.

Example 8

The step of forming the chelate, the step of forming the polymer precipitates, and performing the filtration were carried out by using the same process as Example 6, except that ethylenediaminetetraacetic acid dipotassium salts were used as the chelate agent in the course of forming the chelate, and the amount of the residual catalyst metal compound in the polymer was measured. The results are described in Table 1.

Example 9

The step of forming the chelate, the step of forming the polymer precipitates, and the filtration step were performed by using the same process as Example 6, except that dimethylglyoxime was used as the chelate agent in the course of forming the chelate, and the amount of the residual catalyst metal compound in the polymer was measured. The results are described in Table 1.

Example 10

1) Step of Forming the Chelate 276 ml of the polymer solution that was obtained in Preparation Example 2 was put into a 3 L batch reactor, 900 ml of toluene was added, and agitation was performed at a temperature of 90° C. and an agitation speed of 500 rpm. After 5 g of the solution in which ethylenediaminetetraacetic acid tetrasodium salts were dissolved in water in content of 10 wt % and 5 g of the solution in which dimethylglyoxime was dissolved in aceton in content of 10 wt % were added and the reaction was performed for 3 hours, the reactants were cooled to normal temperature.

2) Step of Forming Polymer Precipitates

The precipitates were formed by using the same procedure as Example 1.

3) Filtration Step

The procedure of Example 1 was repeated, and the amount of the residual catalyst metal compound in the polymer was measured. The results are described in Table 1.

Comparative Example 1

The step of forming the chelate, the step of forming the polymer precipitates, and the filtration step were performed by using the same process as Example 1, except that a malic acid was used as the chelate agent in the course of forming the chelate, and the amount of the residual catalyst metal compound in the polymer was measured. The results are described in Table 1.

Comparative Example 2

The step of forming the chelate, the step of forming the polymer precipitates, and the filtration step were performed by using the same process as Example 1, except that a latic acid was used as the chelate agent in the course of forming the chelate, and the amount of the residual catalyst metal compound in the polymer was measured. The results are described in Table 1.

Comparative Example 3

The step of forming the chelate, the step of forming the polymer precipitates, and the filtration step were performed by using the same process as Example 1, except that a tartaric acid was used as the chelate agent in the course of forming the chelate, and the amount of the residual catalyst metal compound in the polymer was measured. The results are described in Table 1.

Comparative Example 4

The step of forming the chelate, the step of forming the polymer precipitates, and the filtration step were performed by using the same process as Example 6, except that a malic acid was used as the chelate agent in the course of forming the chelate, and the amount of the residual catalyst metal compound in the polymer was measured. The results are described in Table 1.

Comparative Example 5

The step of forming the chelate, the step of forming the polymer precipitates, and the filtration step were performed by using the same process as Example 6, except that a latic acid was used as the chelate agent in the course of forming the chelate, and the amount of the residual catalyst metal compound in the polymer was measured. The results are described in Table 1.

Comparative Example 6

The step of forming the chelate, the step of forming the polymer precipitates, and the filtration step were performed by using the same process as Example 6, except that a tartaric acid was used as the chelate agent in the course of forming the chelate, and the amount of the residual catalyst metal compound in the polymer was measured. The results are described in Table 1.

TABLE 1

|  | Used polymer solution | Reaction temperature(° C.) | Amount of residual catalyst(ppm) |
| --- | --- | --- | --- |
| Example 1 | Preparation Example 1 | 90 | 1.5 |
| Example 2 | Preparation Example 1 | 90 | 5 |
| Example 3 | Preparation Example 1 | 90 | 7 |
| Example 4 | Preparation Example 1 | 90 | 13 |
| Example 5 | Preparation Example 1 | 90 | 6 |
| Example 6 | Preparation Example 2 | 90 | 3 |
| Example 7 | Preparation Example 2 | 90 | 5 |
| Example 8 | Preparation Example 2 | 90 | 4 |
| Example 9 | Preparation Example 2 | 90 | 11 |
| Example 10 | Preparation Example 2 | 90 | 6 |
| Comparative Example 1 | Preparation Example 1 | 90 | 35 |
| Comparative Example 2 | Preparation Example 1 | 90 | 36 |
| Comparative Example 3 | Preparation Example 1 | 90 | 34 |
| Comparative Example 4 | Preparation Example 2 | 90 | 65 |
| Comparative Example 5 | Preparation Example 2 | 90 | 60 |
| Comparative Example 6 | Preparation Example 2 | 90 | 62 |

From Table 1, it can be seen that the amount of the residual catalyst metal compound is significantly low in Examples of the present invention in comparison with a known method of removing a metal compound.

The invention claimed is:

1. A method of removing a residual catalyst palladium compound from a polymer solution, comprising the steps of:
    a) mixing a solution in which at least one organic nitrogen compound is dissolved in a polar solvent and the polymer solution to precipitate a chelate compound containing the organic nitrogen compounds and the residual catalyst palladium compound;
    b) adding an ethyl alcohol to the solution mixture to dissolve the chelate compound and to precipitate a polymer; and
    c) filtering the precipitated polymer,
    wherein the polar solvent of step a) comprises at least one selected from the group consisting of water, acetone, ethyleneglycol, and glycerol,
    wherein the organic nitrogen compound of the step a) is selected from the group consisting of ethylenediaminetetraacetic acid tetrasodium salts, etheylenediaminetetraacetic acid disodium salts, and ethylenediaminetetraacetic acid dipotassium salts,
    wherein the polymer is an additional polymer, a homopolymer, or a copolymer of norbornene-based monomers represented by Formula 3 or 4, that is a homopolymer of one monomer selected from the monomers or a copolymer of at least two monomers selected from the monomers:

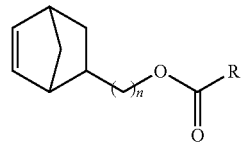

[Formula 3]

wherein
n is an integer of 1 to 10, and
R is an alkyl group having 1 to 20 carbon atoms,

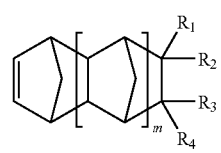

[Formula 4]

wherein
m is an integer of 0 to 4,
$R_1$, $R_2$, $R_3$, and $R_4$ are the same or different from each other, and are each independently hydrogen; halogen; linear or branched alkyl that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenyl that has 2 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynyl that has 3 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkyl that has 3 to 12 carbon atoms and is unsubstituted substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; aryl that has 6 to 40 carbon atoms and is unsubstituted substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or a polar functional group that comprises at least one selected form the group consisting of oxygen, nitrogen, phosphorus, sulfur, silicon, and boron, and
with a proviso that when $R_1$, $R_2$, $R_3$, and $R_4$ are not hydrogen, halogen, or the polar functional group, $R_1$ and $R_2$, or $R_3$ and $R_4$ may be connected to each other to form an alkylidene group having 1 to 10 carbon atoms, or $R_1$ or $R_2$ may be connected to any one of $R_3$ and $R_4$ to form a saturated or unsaturated aliphatic ring having 4 to 12 carbon atoms or an aromatic ring having 6 to 24 carbon atoms.

2. The method according to claim 1, wherein the organic nitrogen compound of the step a) is used in an amount of 0.1 to 20 parts by weight based on 100 parts by weight of the polymer.

3. The method according to claim 1, wherein a content of the polymer of the polymer solution in step a) is 2 to 50 wt % and a concentration of the solution in which at least one compound is dissolved is 0.1 to 50 wt %.

4. The method according to claim 1, wherein a weight ratio of the polymer and the ethyl alcohol in the step b) is 1:3 to 50.

5. The method according to claim 1, wherein in the norbornene-based monomers that is represented by Formula 4, the polar functional group is —$R_5OR_6$, —$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_{50})_p$—$OR_6$, —$(OR_5)_p$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$—, —$R_5C(=S)SR_6$, —$R_5SO_3R_6$, —$SO_3R_6$, —$R_5N=C=S$, —$N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$,

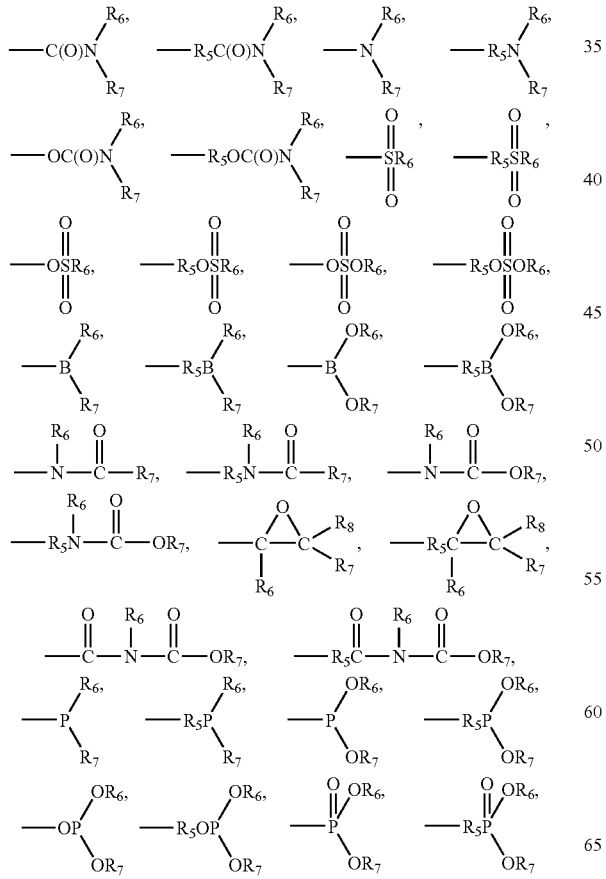

$$—R_5—\overset{O}{\underset{\|}{C}}—NH—R_5—Si\overset{R_6}{\underset{R_8}{—R_7,}}$$

$$—R_5—\overset{O}{\underset{\|}{C}}—NH—R_5—Si\overset{OR_6}{\underset{OR_8}{—OR_7,}}$$

$$—\overset{O}{\underset{\|}{C}}—O—CH_2—\overset{OR_6}{\underset{}{CH}}—CH_2—\overset{R_6}{\underset{}{N}}—R_5—Si\overset{R_6}{\underset{R_8}{—R_7,}}$$

$$—\overset{O}{\underset{\|}{C}}—O—CH_2—\overset{OR_6}{\underset{}{CH}}—CH_2—\overset{R_6}{\underset{}{N}}—R_5—Si\overset{OR_6}{\underset{OR_8}{—OR_7,}}$$

$$—R_5—\overset{O}{\underset{\|}{C}}—O—CH_2—\overset{OR_6}{\underset{}{CH}}—CH_2—\overset{R_6}{\underset{}{N}}—R_5—Si\overset{R_6}{\underset{R_8}{—R_7,}}$$

$$—R_5—\overset{O}{\underset{\|}{C}}—O—CH_2—\overset{OR_6}{\underset{}{CH}}—CH_2—\overset{R_6}{\underset{}{N}}—R_5—Si\overset{OR_6}{\underset{OR_8}{—OR_7,}}$$

$$—R_5—\overset{Cl^-}{\underset{}{NH_2^+}}—R_5—\overset{R_6}{\underset{}{N}}—R_5—Si\overset{R_6}{\underset{R_8}{—R_7,}}$$

$$—R_5—\overset{Cl^-}{\underset{}{NH_2^+}}—R_5—\overset{R_6}{\underset{}{N}}—R_5—Si\overset{OR_6}{\underset{OR_8}{—OR_7,}}$$

$$—\overset{Cl^-}{\underset{}{NH_2^+}}—R_5—\overset{R_6}{\underset{}{N}}—R_5—Si\overset{R_6}{\underset{R_8}{—R_7,}}\text{ or}$$

$$—\overset{Cl^-}{\underset{}{NH_2^+}}—R_5—\overset{R_6}{\underset{}{N}}—R_5—Si\overset{OR_6}{\underset{OR_8}{—OR_7,}}$$

in the polar functional group, $R_5$s are the same or different from each other, and are each independently linear or branched alkylene that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenylene that has 2 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynylene that has 3 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkylene that has 3 to 12 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; arylene that has 6 to 40 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; alkoxylene that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or carbonyloxylene that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy, $R_6$, $R_7$, and $R_8$ are the same or different from each other, and are each independently hydrogen; halogen; linear or branched alkyl that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenyl that has 2 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynyl that has 3 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkyl that has 3 to 12 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; aryl that has 6 to 40 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; alkoxy that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or carbonyloxy that has 1 to 20 carbon atoms and is unsubstituted or substituted by at least one substituent selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy, and p is each independently an integer of 1 to 10.

6. The method according to claim 1,
wherein in the polymer solution, the polymer compound is dissolved in a solvent that is selected from the group consisting of toluene, chloroform, hexane, and a hydrocarbon solvent having 4 to 10 carbon atoms.

* * * * *